(12) United States Patent
Yasukawa et al.

(10) Patent No.: US 8,876,225 B2
(45) Date of Patent: Nov. 4, 2014

(54) ACTUATOR CONTROL UNIT AND ELECTRIC-MECHANICAL BRAKE UNIT

(75) Inventors: Daisuke Yasukawa, Hitachinaka (JP); Hirofumi Watanabe, Tsuchiura (JP)

(73) Assignee: Hitachi, Ltd., Tokyo (JP)

( * ) Notice: Subject to any disclaimer, the term of this patent is extended or adjusted under 35 U.S.C. 154(b) by 971 days.

(21) Appl. No.: 12/018,631

(22) Filed: Jan. 23, 2008

(65) Prior Publication Data

US 2008/0236963 A1 Oct. 2, 2008

(30) Foreign Application Priority Data

Mar. 28, 2007 (JP) .................................. 2007-083244

(51) Int. Cl.
| | |
|---|---|
| *B60T 8/36* | (2006.01) |
| *H01L 23/52* | (2006.01) |
| *H01L 23/48* | (2006.01) |
| *H01R 13/52* | (2006.01) |
| *H01R 13/621* | (2006.01) |
| *B60T 13/74* | (2006.01) |

(52) U.S. Cl.
CPC .......... *B60T 13/741* (2013.01); *H01R 13/5219* (2013.01); *H01R 13/6215* (2013.01)
USPC .. 303/119.3; 257/691; 257/693; 257/E23.079

(58) Field of Classification Search
USPC ............ 188/72.1, 73.1, 119.3, 199, 156–165; 257/690, 691, 693, 678; 303/119.3, 303/199, DIG. 10
See application file for complete search history.

(56) References Cited

U.S. PATENT DOCUMENTS

| | | | | |
|---|---|---|---|---|
| 5,288,141 | A * | 2/1994 | Isshiki et al. ................ | 303/119.3 |
| 6,354,674 | B1 * | 3/2002 | Iwamoto et al. ............ | 303/119.3 |
| 6,445,584 | B1 | 9/2002 | Riehl et al. | |
| 7,158,372 | B2 * | 1/2007 | Sanada et al. ................. | 361/752 |
| 7,161,323 | B2 * | 1/2007 | Ajima et al. .................. | 318/629 |
| 2003/0086246 | A1 | 5/2003 | Wakabayashi et al. | |
| 2003/0200761 | A1 | 10/2003 | Funahashi et al. | |
| 2005/0032402 | A1 | 2/2005 | Takanashi et al. | |
| 2005/0161809 | A1 * | 7/2005 | Nakatsu et al. ............... | 257/734 |
| 2005/0247527 | A1 * | 11/2005 | Severinsson ................. | 188/72.2 |
| 2006/0017321 | A1 | 1/2006 | Tsunooka | |
| 2007/0199775 | A1 * | 8/2007 | Yasukawa .................... | 188/73.1 |
| 2007/0199926 | A1 * | 8/2007 | Watanabe et al. ........ | 219/121.64 |

FOREIGN PATENT DOCUMENTS

| | | |
|---|---|---|
| DE | 199 53 191 A1 | 5/2001 |
| JP | 2000-156922 A | 6/2000 |
| JP | 2002-359020 A | 12/2002 |
| JP | 2003-333731 | * 11/2003 |

OTHER PUBLICATIONS

European Search Report dated May 14, 2012 (three (3) pages).

* cited by examiner

*Primary Examiner* — Vishal Sahni
(74) *Attorney, Agent, or Firm* — Crowell & Moring LLP

(57) ABSTRACT

The invention achieves a further downsizing of an actuator control unit. The actuator control unit has a control circuit controlling an actuator, and a bus bar electrically connected to the control circuit and arranged such as to be partially embedded in an inner portion of a resin case and be partially exposed to an outer portion of the resin case. It is preferable to have a projection portion extending in a wiring direction of the bus bar between two bus bars wired adjacently, having a greater height than an embedded plane of the bus bar in the resin case, and made of an insulating material.

6 Claims, 18 Drawing Sheets

ACTUATOR CONTROL UNIT AND ELECTRIC-MECHANICAL BRAKE UNIT

BACKGROUND OF THE INVENTION

1. Field of the Invention

The present invention relates to an actuator control unit.

2. Background Art

The actuator control unit has become compact year by year. In particular, constructing a solid circuit by arranging a metal conductive plate such as a bus bar or the like so as to achieve a reduction of a mounting area of a connoted board greatly contributes to a downsizing of the control unit.

There has been conventionally known a unit which is mainly provided with bus bars transmitting an electronic signal and an electric power, a resin for insulating between the bus bars and the like as the other structure bodies than the circuit board, and arranges the bus bars while covering with an insulating material (refer, for example, to patent document 1 (JP-A-2000-156922 and patent document 2 (JP-A-2002-359020)).

The inventors of the present invention have considered to further downsize the structure body of the actuator control unit in the light of a layout in a moving body such as a vehicle or the like. However, since the prior art is structured such that the bus bar is embedded in an inner portion of the resin, a space for fluidizing the resin is necessary around the bus bar, and it is hard to form a space between a pedestal for a flat cable to be connected, and the bus bar. Accordingly, it is hard to further downsize.

BRIEF SUMMARY OF THE INVENTION

Taking the matter mentioned above into consideration, an object of the present invention is to achieve a further downsizing of an actuator control unit.

The feature of the present invention exists in a structure in which a bus bar achieving an electric connection of a control circuit controlling an actuator is arranged in such a manner that a part of the bus bar is embedded in an inner portion of a circuit mounting case and a part of the bus bar is exposed to an outer portion of the circuit mounting case.

Specifically, in accordance with the present invention, there is provided an actuator control unit comprising:

a control circuit controlling an actuator; and a bus bar electrically connected to the control circuit and arranged such as to be partially embedded in an inner portion of a circuit mounting case constructed by a resin and be partially exposed to an outer portion of the circuit mounting case.

Further, in the actuator control unit in accordance with the present invention, it is preferable that one side surface in a wiring direction of the bus bar is embedded in the circuit mounting case, and an opposite side surface to the one side surface is exposed to the outer portion of the circuit mounting case.

Further, in the actuator control unit in accordance with the present invention, it is preferable that the bus bar is partially embedded in the circuit mounting case and is partially exposed to the outer portion of the circuit mounting case, in the other two surfaces which are different from the one side surface and the opposite side surface.

Further, in the actuator control unit in accordance with the present invention, it is preferable that the circuit mounting case has a first bus bar and a second bus bar intersecting with each other, and the first bus bar and the second bus bar both have an exposure portion in one surface of the circuit mounting case, the first bus bar is exposed to the one surface of the circuit mounting case and the second bus bar is exposed to an opposite surface to the one surface of the circuit mounting case, in the intersecting position.

Further, in the actuator control unit in accordance with the present invention, it is preferable that the circuit mounting case has a projection portion which has a greater height than an embedded plane of the bus bar in the circuit mounting case and is constructed by an insulating material, between two bus bars wired adjacently.

Further, in the actuator control unit in accordance with the present invention, it is preferable that the projection portion of the circuit mounting case extends in a wiring direction of the two bus bars.

Further, in the actuator control unit in accordance with the present invention, it is preferable that the projection portion of the circuit mounting case is integrally molded with the circuit mounting case.

Further, in the actuator control unit in accordance with the present invention, it is preferable that the projection portion of the circuit mounting case is formed independently from the circuit mounting case, and is attached to the circuit mounting case.

Further, in the actuator control unit in accordance with the present invention, it is preferable that the actuator control unit has the other combined part facing to the surface in which the projection portion of the circuit mounting case is provided, and the other combined part has a groove provided in such a manner as to cover the projection portion, in a position corresponding to the projection portion.

Further, in the actuator control unit in accordance with the present invention, it is preferable that the bus bar is welded to the other terminal at a position which is exposed to the outer portion of the circuit mounting case.

Further, in the actuator control unit in accordance with the present invention, it is preferable that the circuit mounting case has a projection portion in an inverse side to the projection portion with respect to the bus bar, and the bus bar is welded to the other terminal at a position which is exposed to the outer portion of the circuit mounting case between the projection portion and the inverse side projection portion.

Further, in the actuator control unit in accordance with the present invention, it is preferable that the projection portion of the inverse side projection portion has a taper structured such that an interval therebetween becomes narrow in proportion as it comes close to the bus bar.

Further, in the actuator control unit in accordance with the present invention, it is preferable that the circuit mounting case has a projection portion having a surface which is orthogonal to the wiring direction of the bus bar and positions the other terminal.

Further, in the actuator control unit in accordance with the present invention, it is preferable that the circuit mounting case has a projection portion having a surface which is orthogonal to the wiring direction of the bus bar and positions the other terminal.

Further, in the actuator control unit in accordance with the present invention, it is preferable that the control circuit has an inverter element module controlling the actuator, and a control board controlling the inverter element module, and the bus bar is electrically connected at least to any one of the inverter element module and the control board.

Further, in the actuator control unit in accordance with the present invention, it is preferable that the inverter element module is fixed to the circuit mounting case, and the bus bar is connected to the terminal of the inverter element module in accordance with a laser welding.

Further, in the actuator control unit in accordance with the present invention, it is preferable that the control board is fixed to the circuit mounting case, and the bus bar is connected to the terminal of the control board in accordance with an aluminum wire bonding.

Further, in the actuator control unit in accordance with the present invention, it is preferable that the actuator control unit has an external shielding metal case assembled in the circuit mounting case and having a hole passing through a connector portion of the circuit mounting case, and a harness electrically connecting the connector portion and an external electric circuit and fixed to the external shielding metal case, and the bus bar is connected to the terminal or the wiring of the connector.

Further, in accordance with the present invention, there is provided an electric-mechanical brake unit comprising:
the actuator control unit described above;
a motor serving as an actuator driven by the inverter element module;
a rotation linear transformation mechanism transforming the rotation of the motor into a rectilinear motion; and
a pad thrust by the rectilinear motion of the rotation linear transformation mechanism and generating a braking force on the basis of a friction drag with a wheel or a disc rotor provided in an axle.

Further, in the electro-mechanical brake unit in accordance with the present invention, it is preferable that the actuator control unit is arranged in an opposite side to the pad on the basis of the motor, and the control board, the circuit mounting case and the inverter element module are arranged in this order from the close side of the motor in an inner portion of the actuator control unit.

It is possible to achieve a downsizing of the actuator control unit.

Other objects, features and advantages of the invention will become apparent from the following description of the embodiments of the invention taken in conjunction with the accompanying drawings.

DETAILED DESCRIPTION OF THE INVENTION

Figure 2:
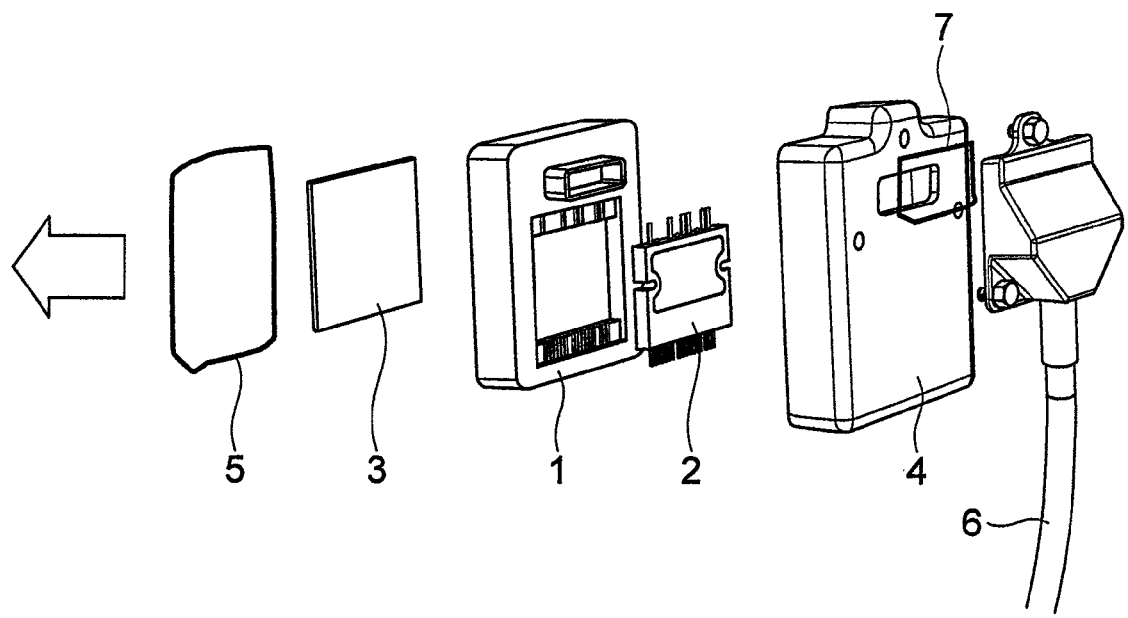
FIG. 2 is an exploded perspective view of an actuator integrated type control unit.

FIG. 2 is an exploded perspective view of an actuator integrated type control unit.

In this embodiment, a control board 3 controlling an actuator and an inverter element module 2 driving the actuator are mounted to a resin case 1 serving as a circuit mounting case, and a connecting portion therebetween is connected to a bus bar wired within the resin case 1, whereby an electric circuit is constructed. The control board 3 is connected to the bus bar wired within the resin case 1, for example, in accordance with an aluminum wire bonding. The inverter element module 2 is connected to the bus bar wired within the resin case 1, for example, in accordance with a welding between terminals. The electric circuit structured as mentioned above is connected to an electric circuit in an external portion by exposing the bus bar wired within the resin case 1 to a connector shaped portion of the resin case 1 and connecting the exposed portion to a connector of a harness 6.

In this case, the resin molding case 1 doubles as the circuit mounting case, however, the circuit mounting case is not necessarily constituted by the case directly mounting the inverter element module 2 and the control board 3, but may be constituted by a case bearing only the wiring. Further, the case is not necessarily constituted by a case serving as an outer shell having the circuit parts in an inner portion, but may be constituted by a resin molding part embedded in the other outer shell case.

Further, an outer side of the electric circuit is covered with a part having a high stiffness, for example, an outer metal case 4 or a part enduring an environment, in correspondence to an environment in which the control unit is installed, thereby protecting the mounting parts such as the control board 3 and the like from the external environment. These parts are assembled so as to be integrally assembled as an actuator positioned in a direction of an arrow in the drawing.

In this case, in correspondence to the environment in which the control unit is installed, for example, for the purpose of a waterproof or the like, a sealing characteristic in the inner portion of the control unit case is secured by inserting a flexible seal part, for example, a rubber seal 5 with respect to the actuator, a rubber seal 7 with respect to a harness or the like, at a connection position communicated with the outer portion of the control unit between the parts.

It goes without saying that a shape, a magnitude, a thickness and a width of each of the parts described above and shown in the drawings are not limited to those indicated here, but a concept thereof is schematically shown here.

Details of the assembly process mentioned above are shown in FIGS. 4 to 7.

Figure 3:
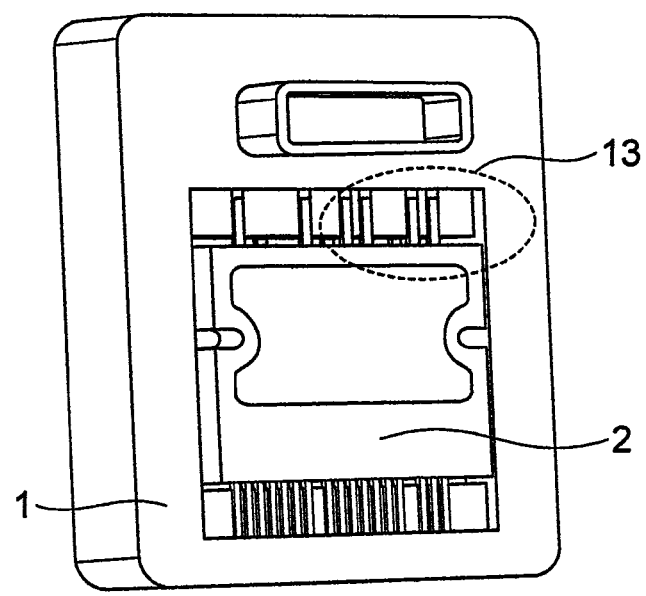
FIG. 3 is a view showing a first step of an assembly process of the control unit in FIG. 2.

FIG. 3 shows a first step of an assembly process of the control unit in FIG. 2. FIG. 3 shows a state in which the inverter element module 2 is mounted to the resin case 1. At this time, in a terminal connection portion 13 in which the bus bar wired in the resin case 1 and the terminal of the inverter element module 2, the terminals are connected to each other, for example, using a bonding method such as a laser welding or the like. It is desirable that the inverter element module 2 itself is fixed to the resin case 1. As a fixing method at this time, for example, a screw, a bolt or the like may be fastened to an insert screw embedded in the resin case 1, thereby holding the case of the inverter element module 2 on the basis of a force applied to a screw head thereof.

Figure 4:
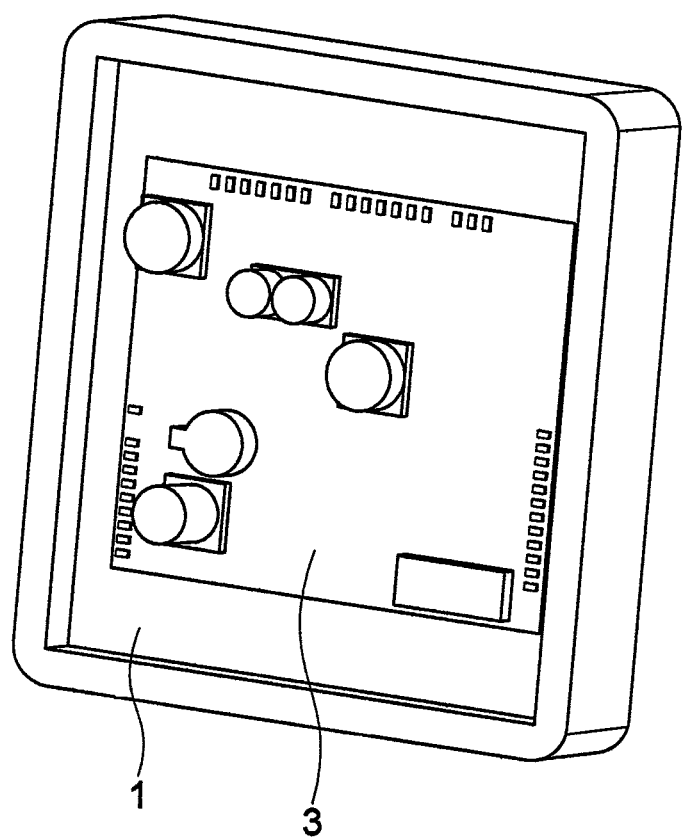
FIG. 4 is a view showing a second step of the assembly process of the control unit in FIG. 2.

FIG. 4 shows a second step of the assembly process of the control unit in FIG. 2. FIG. 4 shows a state in which the control board 3 is mounted to the resin case 1. At this time, the bus bar arranged in the resin casing 1 and the substrate pad of the control board 3 employ, for example, an aluminum wire bonding or the like. At this time, the board may be fixed to the resin case 1 by using an adhesive agent or the like. Further, in a connection using a simple wiring, it is possible to consider that the board is fixed to the resin case 1 by a bolt, a snap fit or the like.

Figure 5:
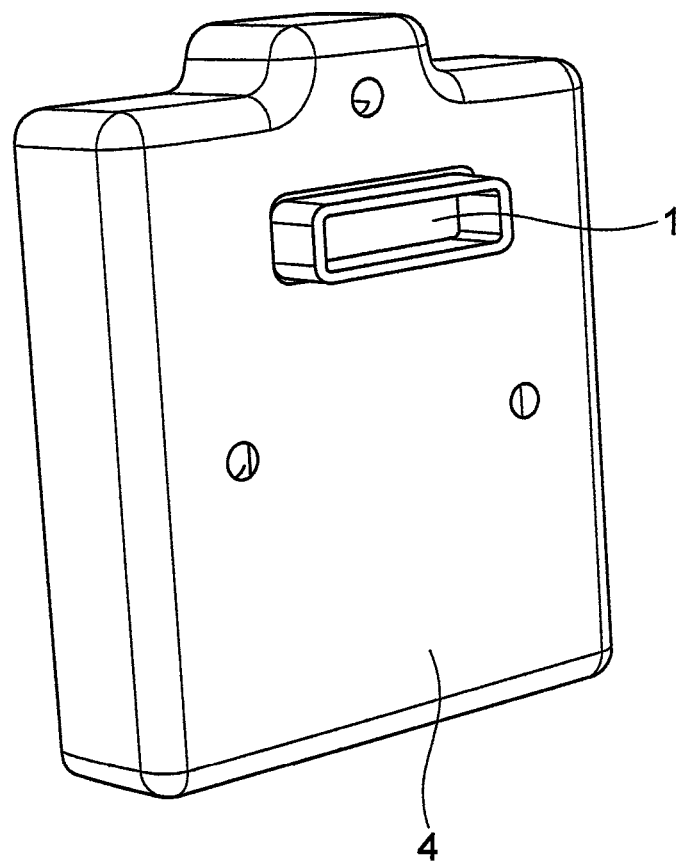
FIG. 5 is a view showing a third step of the assembly process of the control unit in FIG. 2.

FIG. 5 shows a third step of the assembly process of the control unit in FIG. 2. In FIG. 5, the external metal case 4 is assembled in the resin casing 1 to which the control board 3, the inverter element module 2 and the like are mounted. The external metal case 4 is provided with such a hole shape as to protrude the connector shaped portion of the resin case 1 arranging the bus bar in the inner portion to an outer portion. In this case, a magnitude of the hole shape may be set such as to secure a working space for connecting the wiring coming out of the actuator to the connection portion of the control unit, while being larger than the magnitude of the connector shape. There can be considered that the connecting work uses, for example, a welding, a soldering, a wire rod having the connector, and the like, however, in the case that the working space is extremely narrow, for example, a laser beam of the laser welding or the like may be irradiated from the working space.

Figure 6:
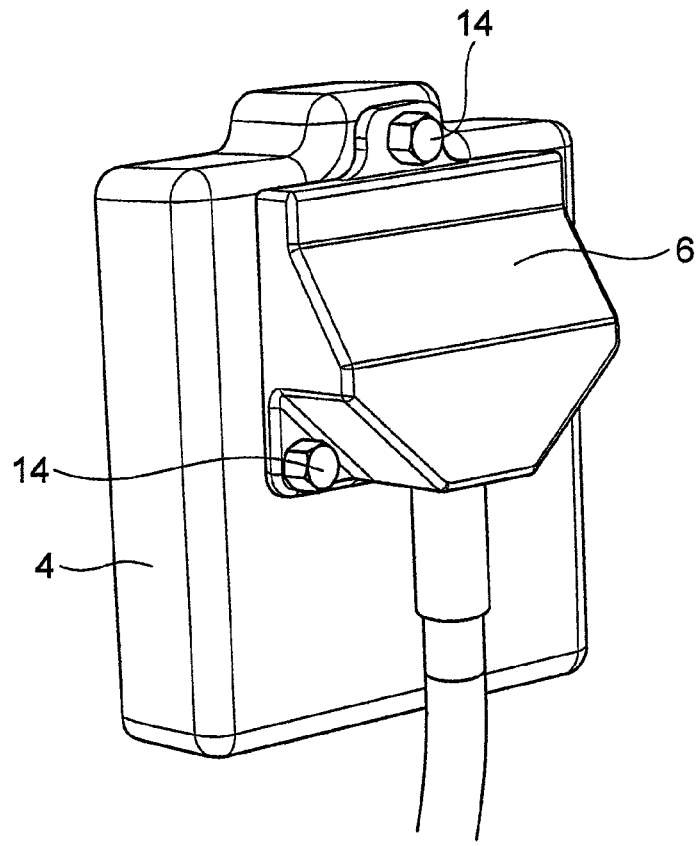
FIG. 6 is a view showing a fourth step of the assembly process of the control unit in FIG. 2.

FIG. 6 shows a fourth step of the assembly process of the control unit in FIG. 2. The harness 6 embedding the connector connected to the connector portion of the resin casing 1 is assembled in the external metal case 4 by using a bolt 14 or the like after the work in FIG. 5. At this time, the casing covering the connector portion of the harness 6 is assembled so as to cover such the hole shape as to protrude the connector shaped portion of the resin casing 1 provided in the external metal case 4 shown in FIG. 5 to the outer portion, and seals the portion with respect to the external environment in the periphery thereof. In this case, since the bolt 14 affects an assembling strength of the harness 6 in addition to the purpose of achieving the seal, the number of the bolt is not limited to the number shown here, and a shape and an assembling place thereof can be changed in correspondence to a specification.

As mentioned above, there is shown a series of outline assembling work in connection with the actuator integrated type control unit, however, the control unit is integrally assembled in the actuator, for example, the electro-mechanical brake as shown in FIG. 6, and is connected to an electric part terminal portion 26 of the actuator, and forms an electromechanical integrated type control unit in which the actuator and the control portion are integrated.

Figure 7:
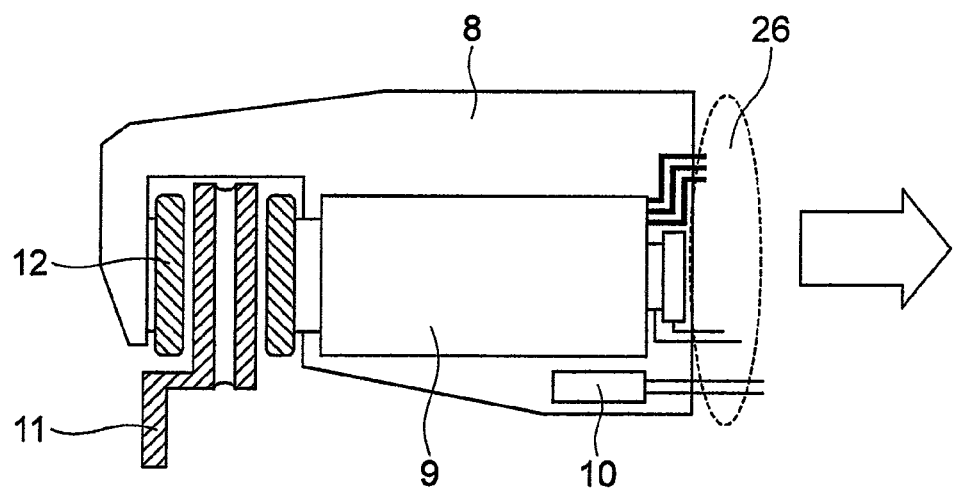
FIG. 7 is a schematic view of an electro-mechanical brake to which the control unit in FIG. 2 is applied.

In the case of the electro-mechanical brake shown here by the conceptual view, in schematic, an actuator 9 (mainly constituted by an electric motor, a mechanism transforming a rotary driving force of the motor into a rectilinear motion and the like) existing within an actuator case 8 presses a pad 12 to a wheel or a rotor 11 provided in an axle on the basis of a rectilinear motion of the actuator so as to generate a friction force, and the control unit serves to control the motor by using an information of a sensor 10 or the like within the actuator case 8. As shown in FIG. 7, the actuator control unit is arranged in an opposite side to the pad on the basis of the motor, and the control board 3, the circuit mounting case and the inverter element module 2 are arranged in this order from the close side to the motor in the inner portion of the actuator control unit as shown in FIG. 2. The most heat generating element in the electro-mechanical brake unit is the pad 12. For example, the control board or the like can be improved its heat resisting performance by being arranged as far as possible from the pad 12. Further, since the inverter element module 2 comes to a heat generating source, the inverter element module 2 can be improved in a heat radiating performance so as to be stably operated, by being arranged between the circuit mounting case and the external metal case 4.

In this case, in recent days in which an electronic control of a motor vehicle is progressed, it goes without saying that it is necessary to downsize the control unit which is frequently mounted, for various reasons such as a securing of an occupation space, a downsizing of the vehicle, a design and the like. Accordingly, the present embodiment creates an idea for further downsizing and lightening the control unit having the so-called bus bar embedded resin case constructing the solid circuit, for example, embedding and wiring the bus bar, and aiming the reduction of the board mounting area, and indicates a solution of the problem at that time.

Figure 8A:
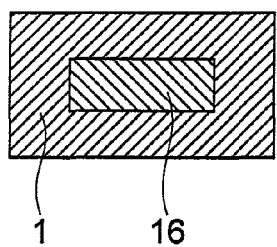
FIGS. 8A, 8B and 8C are a reference view and schematic views showing a bus bar embedded structure in accordance with the present embodiment.
Figure 8B:
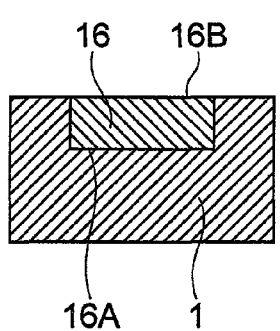
Figure 8C:
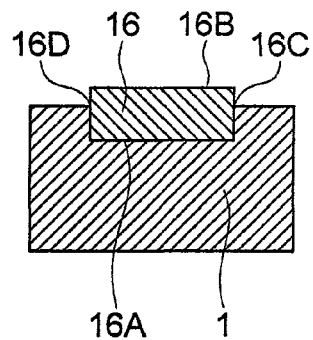

FIGS. 8A, 8B and 8C show bus bar embedded structures in accordance with a reference and the present embodiment. These views are views as seen from a cross section which is orthogonal to the bus bar. The conventional bus bar embedded structure is structured, as shown in FIG. 8A, such that an embedded bus bar 16 is completely embedded in the inner portion of the resin case 1. Accordingly, at a position at which the electric part or the like in the external portion is connected to the bus bar, they can be connected only by exposing the bus bar from the resin case 1. In other words, it is necessary to secure a resin flowing portion for the resin case 1 around the embedded bus bar 16, and a thickness about 2 to 3 mm is necessary around the embedded bus bar to the minimum.

The embedded bus bar 16 is exposed to the surface of the resin case 1 or to the outside of the surface, as shown in FIG. 8B or 8C in the present embodiment. In other words, the embedded bus bar 16 is structured such as to be partly embedded in the inner portion of the circuit mounting case and be partly exposed to the outer portion of the circuit mounting case. In this embodiment, as is known from FIG. 8B showing the cross sectional view orthogonal to the bus bar, the bus bar is structured such that one side surface 16A in a wiring direction of the bus bar is embedded in the circuit mounting case, and an opposite side surface 16B to the one side surface is exposed to the outer portion of the circuit mounting case. Further, in FIG. 8C, the other two surfaces (16C and 16D) which are different from the one side surface 16A and the opposite side surface 16B are partly embedded in the circuit mounting case and are partly exposed to the outer portion of the circuit mounting case. Accordingly, the thickness of the resin is not necessary in the surface side to which the bus bar is exposed. A description will be given in detail of this structure with reference to FIG. 9.

Figure 9A:
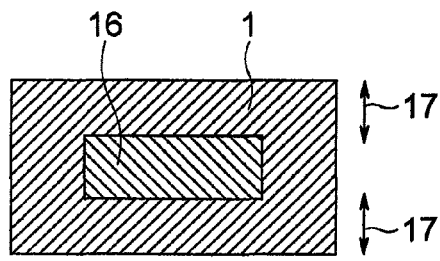
FIGS. 9A and 9B are a reference view and a schematic view showing the bus bar embedded structure in accordance with the present embodiment.
Figure 9B:
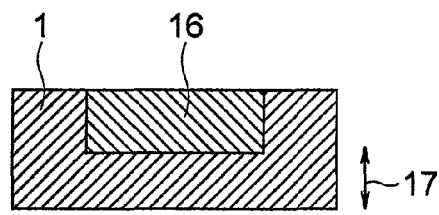

FIGS. 9A and 9B show a bus bar embedded structure in accordance with the reference and the present embodiment. In the prior art shown in FIG. 9A, a resin flowing space 17 at a time of molding in the case that the embedded bus bar 16 is completely embedded in the inner portion of the resin case 1 is necessary in both an upper surface and a lower surface of the bus bar in the drawing. On the other hand, in the case that the embedded bus bar 16 is exposed to the surface of the resin case 1 such as the present embodiment shown in FIG. 9B, the resin flowing space 17 may be provided only in the lower surface side of the bus bar in the drawing, and the thickness as a whole can be reduced.

Figure 10:
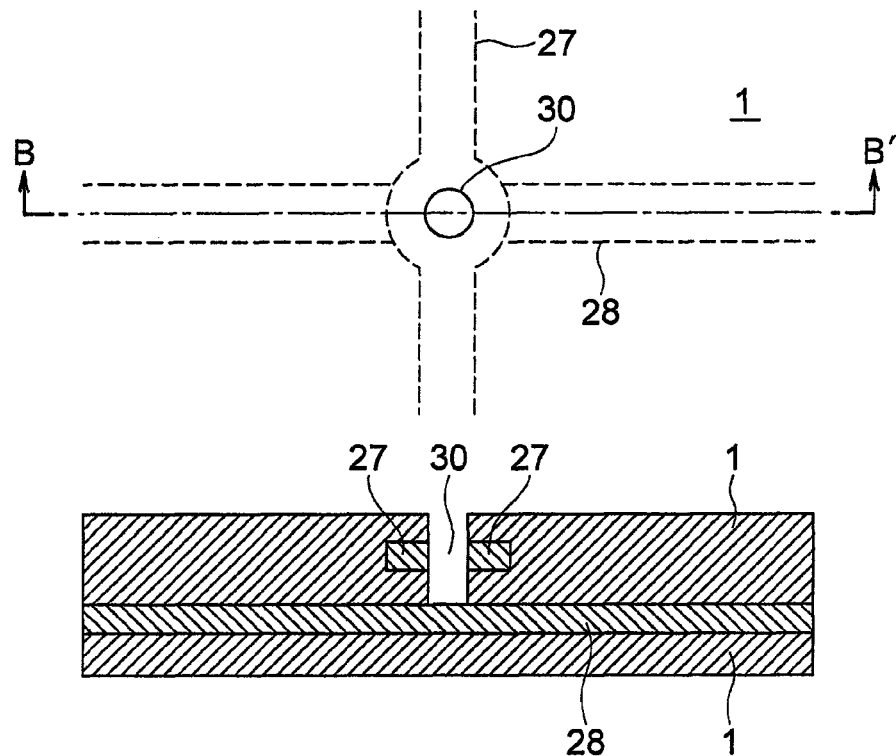
FIG. 10 is a reference view.
Figure 11:
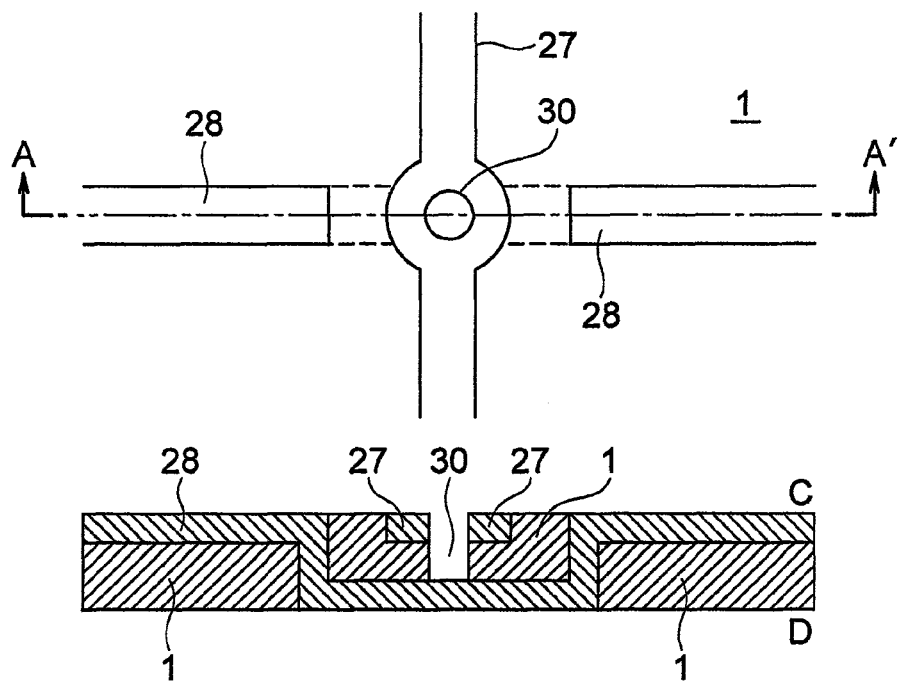
FIG. 11 is a view showing a solid crossing example of a bus bar.

In the meantime, since the bus bar can be arranged only on two dimension by being exposed to the surface of the resin case as mentioned above, and the solid circuit is not established, there is a risk that the area is increased even by making the case thin. Accordingly, there is considered a condition that the bus bars are stereoscopically intersected with each other in an insulating state within the resin case. FIG. 10 is a reference view, and shows a solid crossing state of the bus bar in the case of the conventional bus bar embedding method. FIG. 11 shows a solid crossing state at a time of exposing the bus bar to the surface of the resin casing, in accordance with the present embodiment. In this case, the hole inserting the pin for positioning the bus bar at a time of molding is positioned in the intersecting portion here. Even in the complicated crossing state as mentioned above, it is possible to make the resin case thin by the wiring in accordance with the present invention.

First, FIG. 10 shows a case that a bus bar 27 passing through the above and a bus bar 28 passing through the below are completely embedded such as the prior art. Viewing this structure neat a hole 30 for the positioning pin in a cross section B-B', it is necessary to set a space in which the resin case 1 flows with respect to the bus bar 28 passing through the above is provided in an upper side of the resin case 1 securing the minimum thickness in a lower side of the bus bar 28 passing through the below, and the bus bar 28 passing through the below, and set a space of the resin case 1 in the thickness of the bus bar 27 passing through the above, and in an upper side of the bus bar 27 passing through the above. Accordingly, if the thickness of the bus bar is secured to be 0.8 mm, and the resin flowing thickness is secured to be 2.5 mm to the minimum, about 9.1 mm is necessary for the thickness of the case in FIG. 10.

On the other hand, FIG. 11 shows a case that the surface of the bus bar 27 passing through the above is exposed from the resin case 1, the bus bar 28 passing through the below is exposed in the same surface C of the resin case 1, and is bent at the intersection portion, however, is exposed in the opposite side surface from a surface D in an opposite side to the resin case 1. Viewing this structure near the hole 30 for the positioning pin in a cross section A-A', the resin case 1 exists around the bus bar 28 passing through the below, however, is not positioned in a lower side. Further, the space in which the resin case 1 flows with respect to the bus bar 27 passing through the above is provided in an upper side of the bus bar 28 passing through the below, however, it is not necessary to additionally set the other space than the thickness of the bus bar 27 passing through the above. Therefore, if the thickness of the bus bar is secured to be 0.8 mm, and secure the resin flowing thickness to be 2.5 mm to the minimum, about 4.1 mm is necessary for the thickness in the case of FIG. 24, and the thickness is reduced to half in comparison with the case in FIG. 10. This is because the space necessary for the resin fluidization is wide in comparison with the thickness of the bus bar.

Figure 12:
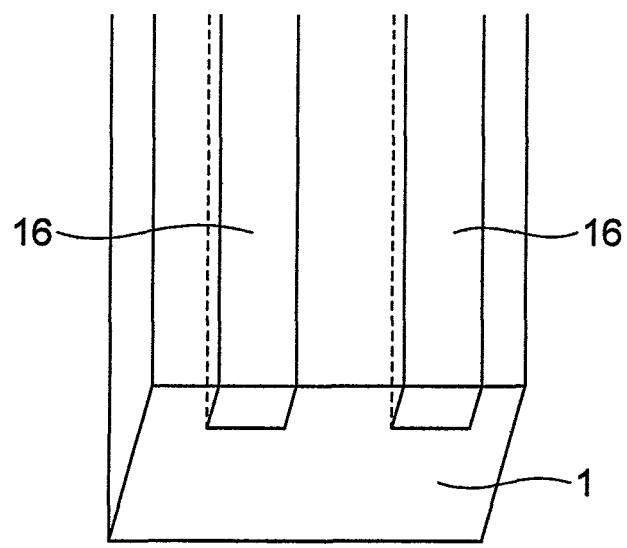
FIG. 12 is a view showing a parallel layout example 1 of a plurality of bus bars.
Figure 12:
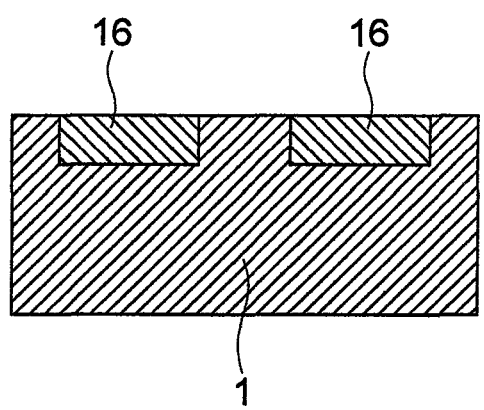

Further, a plurality of bus bars are frequently arranged in parallel for constructing the solid circuit. FIG. 12 shows a parallel layout example 1 of a plurality of bus bars. In this case, there are shown a perspective view and a cross sectional view in a cross section vertical to the wiring direction of the bus bar, as a schematic view in which the surface is exposed onto the surface of the resin case.

Figure 13:
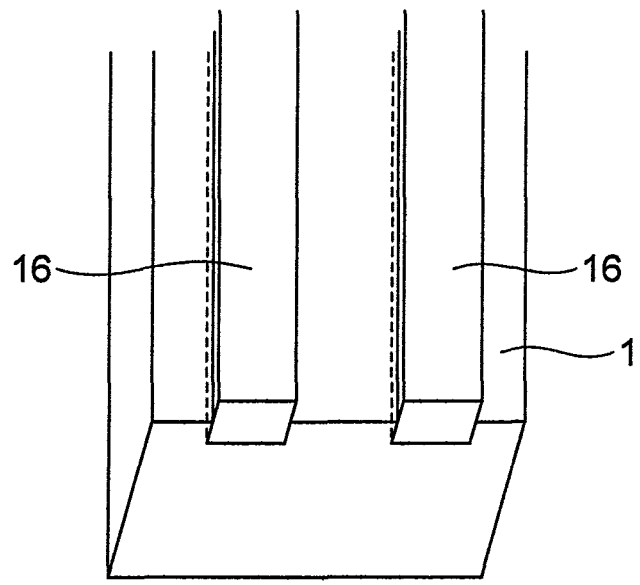
FIG. 13 is a view showing a parallel layout example 2 of a plurality of bus bars.
Figure 13:
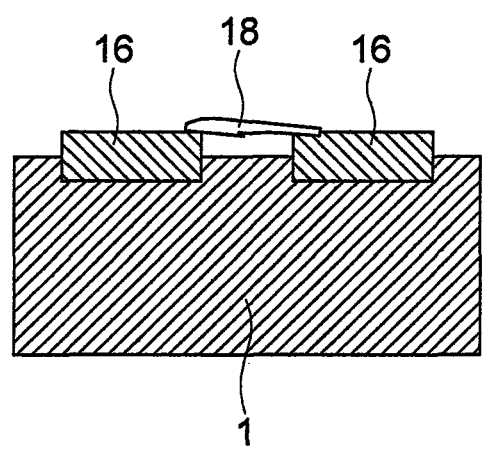

FIG. 13 shows a parallel layout example 2 of a plurality of bus bars. In this case, there are shown a perspective view and a cross sectional view in a cross section vertical to the wiring direction of the bus bar, as a schematic view in which a part including the surface is exposed to the above of the surface of the resin case.

In FIGS. 12 and 13, two bus bars 16 embedded in the resin case are arranged, and the surfaces thereof are exposed from the surface of the resin case 1, it goes without saying that the number of the bus bars is not limited to two, but may be set to plural number more than two, and the layout is not limited as the parallel layout. In the case that the bus bar is arranged as mentioned above, the thickness of the whole may be constituted only by the thickness of the bus bar 16 and the thickness of the resin flowing portion 15 existing in one side surface as mentioned above, and the structure can be made thin.

Figure 14:
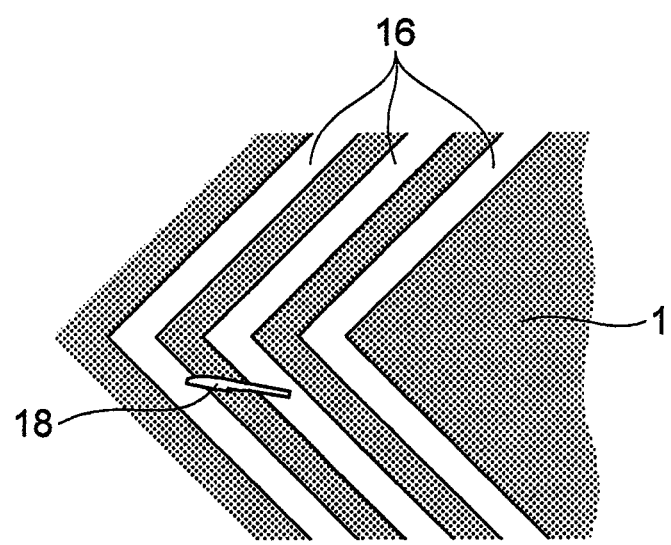
FIG. 14 is a view schematically expressing FIG. 13 by a plane.

In this case, as shown in FIG. 13, if a conductive foreign matter 18 exists in such a manner as to connect between a plurality of bus bars 16, the present structure circuit is shorted. FIG. 14 is a view schematically expressing FIG. 13 by a plane.

The conductive foreign matter 18 in question corresponds to metal shavings of the actuator particularly in the control unit in which the actuator is integrated with the control board portion. Further, there is a possibility that the conductive foreign matter in the manufacturing site is mixed in the process of assembling.

It is hard to prevent the conductive foreign matter 18 from mixing thereinto, however, it is possible to minimize its effect even if it mixes. For example, the minimization can be achieved by completely embedding the bus bar 17 in the inner portion of the resin case 1, or extremely widening the space between a plurality of bus bars 16. However, these methods are inconsistent with achieving the downsizing of the control unit.

Figure 1:
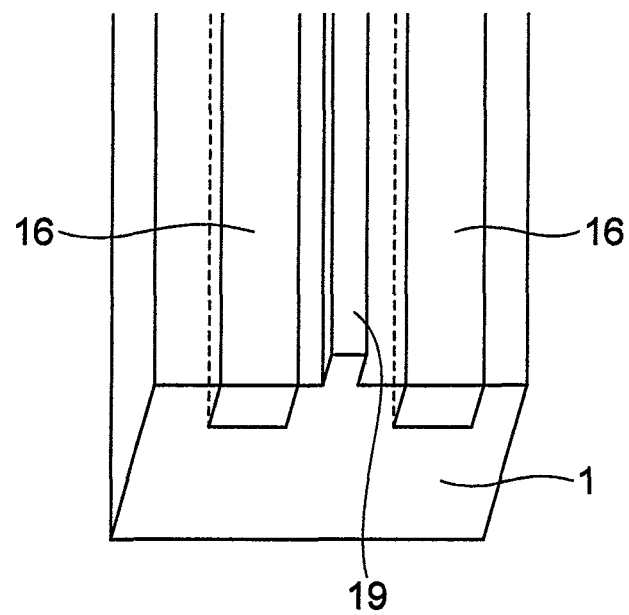
FIG. 1 is a view showing an embodiment of a bus bar and a circuit mounting case.
Figure 1:
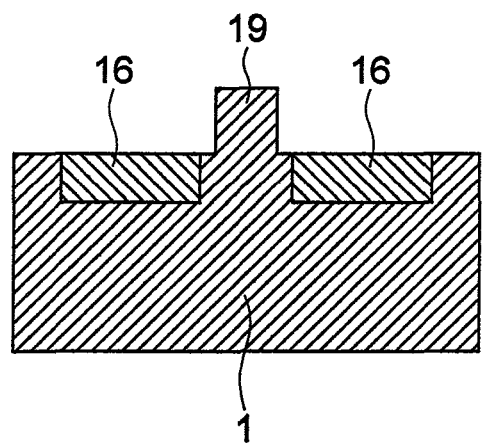

Accordingly, the present invention provides a structure in which a projection portion constituted by an insulative material such as a resin or the like is provided between a plurality of bus bars in which the surfaces are exposed onto the surface of the resin case, in one embodiment of the bus bar embedded structure. FIG. 1 shows an embodiment of the bus bar and the circuit mounting case.

Figure 15:
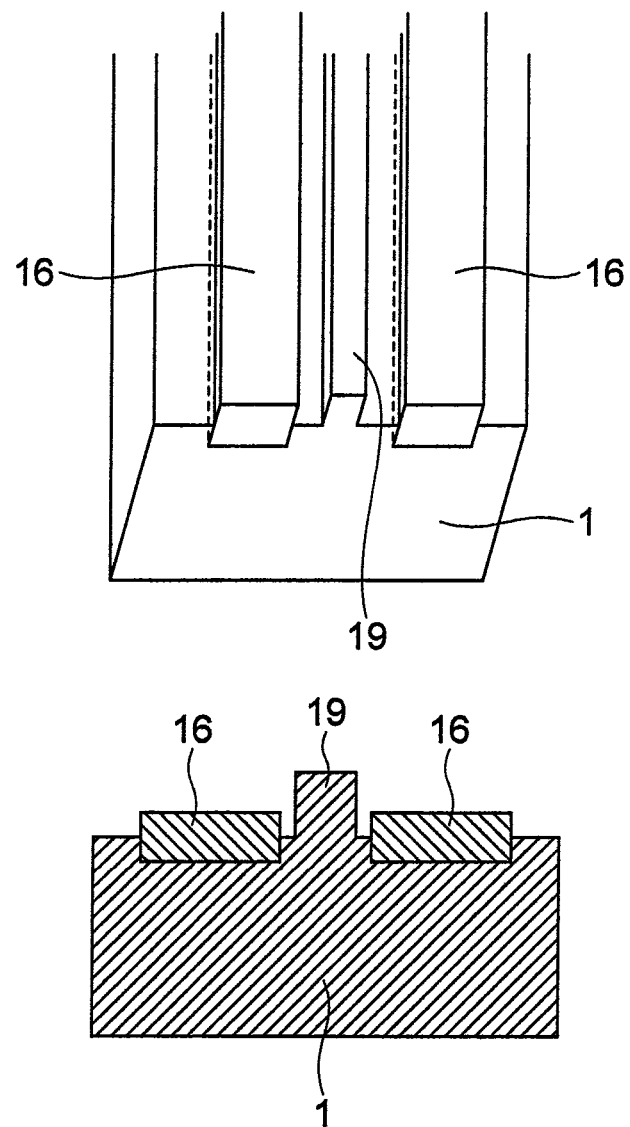
FIG. 15 is a view showing a modified embodiment of FIG. 1.

Further, in the same manner, FIG. 15 shows a modified embodiment of FIG. 1. The structure is made such that the projection portion constituted by the insulating material such as the resin or the like is provided between a plurality of bus bars in which a part including the surface is exposed to the above of the surface of the resin case, and extends in the wiring direction of two bus bars.

Since the projection portion 19 exists between the bus bars 16 as mentioned above, the conductive foreign matter comes into contact with any bus bar 16 and the projection portion 19, and it is possible to reduce a possibility that the conductive foreign matter comes into contact with a plurality of bus bars 16.

Further, as is apparent from the cross sectional shape of the projection portion 19, the projection portion 19 has an effect of changing the strength reduction with respect to the bending caused by the thin thickness of the case to a strength improvement with respect to the bending on the basis of a rib geometry.

In this case, the projection portion 19 may be formed by assembling the projection portion manufactured independently from the resin case 1 in the resin case 1, or may be integrally formed with the resin case 1. Since the resin case 1 embeds the bus bar, the resin case 1 is always made of the insulating material, so that the projection portion can be integrally formed.

Figure 16:
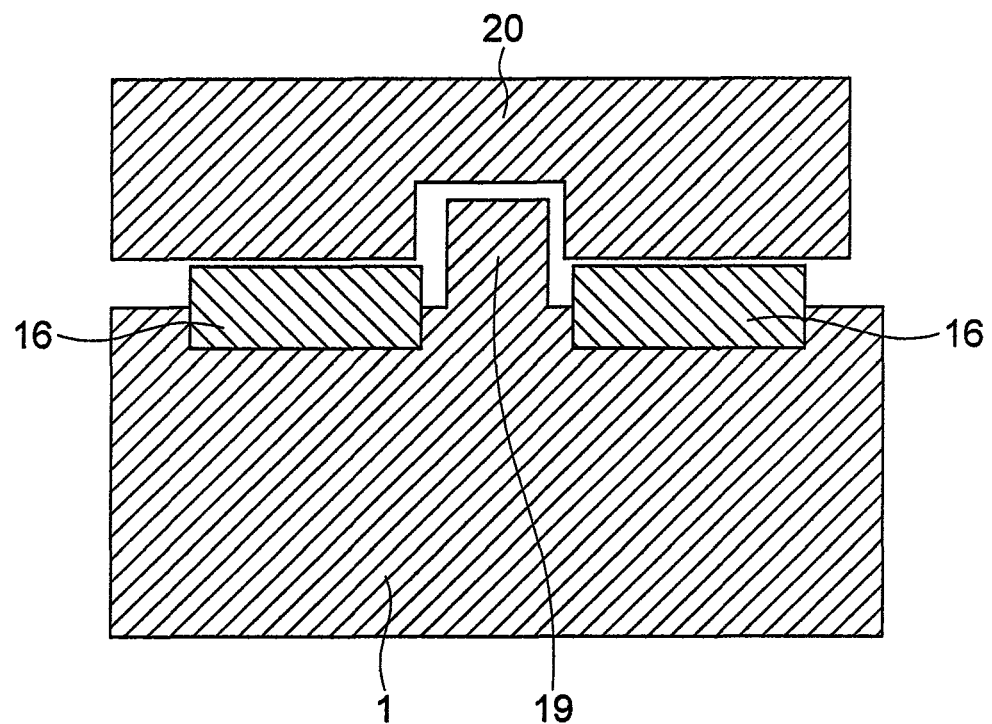
FIG. 16 is a view showing a relation to the other combined parts in FIG. 15.

In this case, if the height of the projection portion 19 is not changed from the conventional thickness of the resin case (the flowing space) for embedding the bus bar, an advantage obtained by making the case thin is lost. However, the thinness can be maintained, for example, by providing a groove obtained by shaving so as to projection portion 19 in a portion close to the projection portion 19 in the combined part 20, as shown in FIG. 16 showing a schematic view of a relation between the resin casing 1 in the case that the projection portion is provided between the bus bars 16, and the combined part 20 adjacent thereto, in the embodiment of the bus bar 16 embedded structure.

Figure 17:
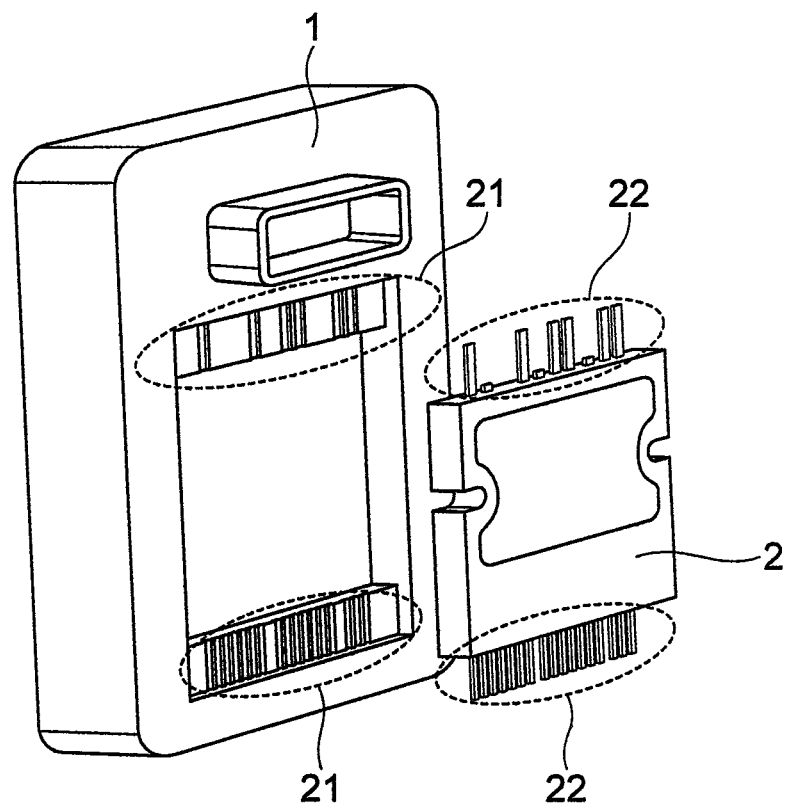
FIG. 17 is a schematic view showing a step of assembling a package element in FIG. 2.

In the control unit integrated with the actuator, FIG. 17 shows a schematic view of an assembling process as an embodiment in the case that it is necessary to assemble the module, for example, the inverter element module 2, serving as the driving element. In this case, a module side weld terminal 22 of the inverter element module 2 is bonded to a portion in which an end portion is exposed as a resin case side bus bar terminal welded portion 21, in the bus bar wired in the resin case 1, for example, by using a bonding method such as a welding, or using a fastening part such as a screw or the like.

Figure 18:
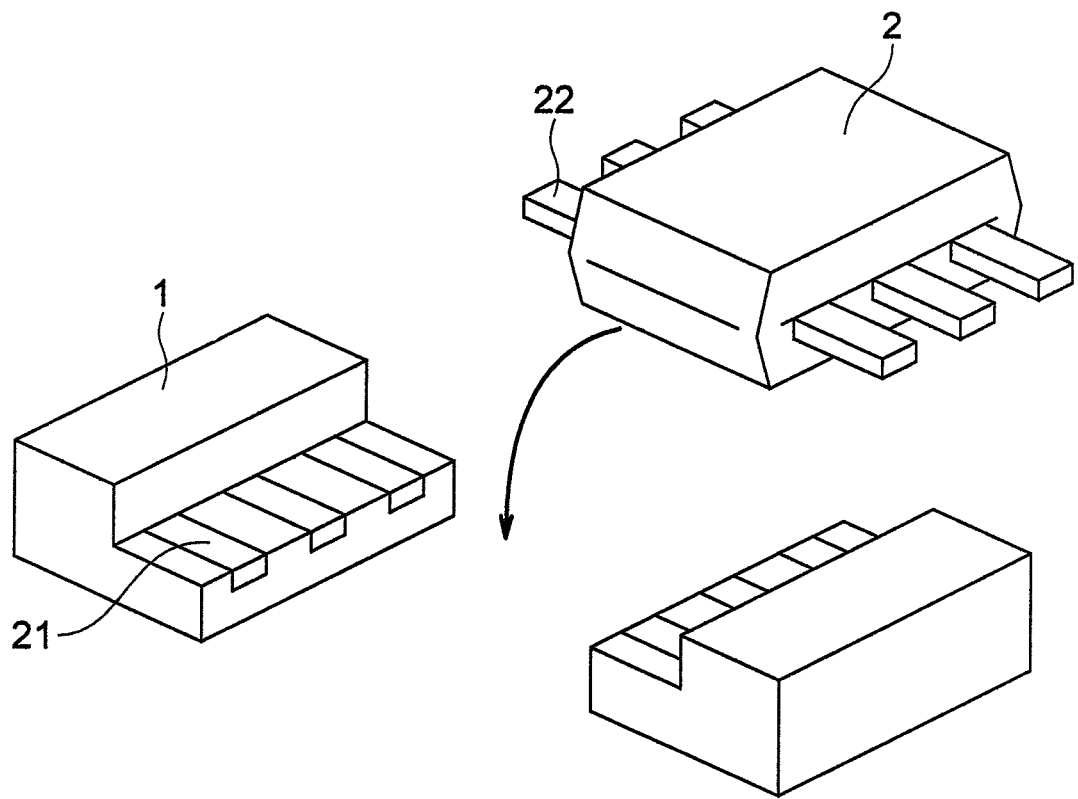
FIG. 18 is a conceptual view showing a part of the assembly process of the package element in FIG. 17 in an enlarged manner.

FIG. 18 conceptually shows a part of an assembling process of a package element in an enlarged manner, with regard to an embodiment of an actuator integrated type control unit.

Figure 19:
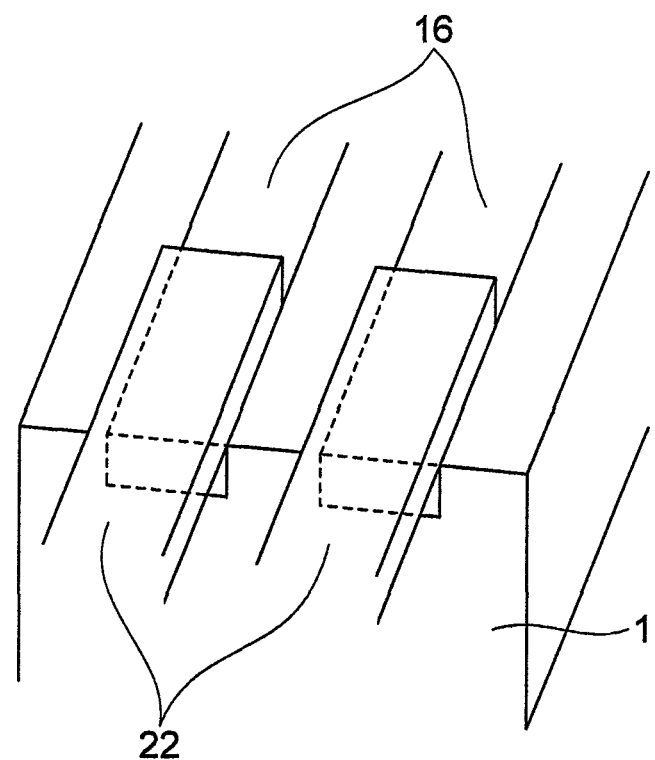
FIG. 19 is an enlarged view of FIG. 18.
Figure 20:
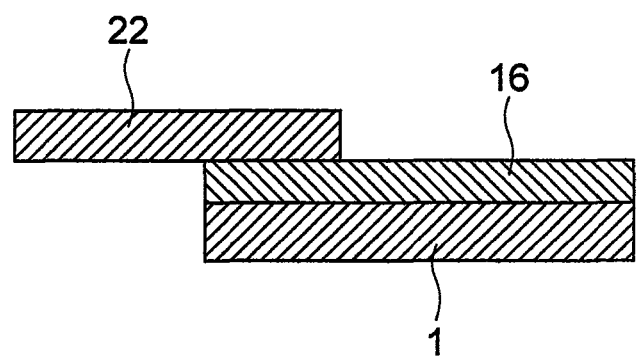
FIG. 20 is a cross sectional view as seen from a side portion of FIG. 19.

Further, FIG. 19 is a view enlarging a portion near the terminal weld portion. FIG. 19 is a schematic view showing a state of bonding the resin case 1 structured by exposing the surfaces of a plurality of bus bars 16 to the surface, and the module side weld terminal 22 connected to the bus bar. FIG. 20 shows a cross section obtained by cutting them in parallel to the wiring direction of the bus bar. In FIG. 20, the resin case 1, the bus bar 16 and the module side weld terminal 22 are overlapped, and are bonded at the contact position.

Figure 21:
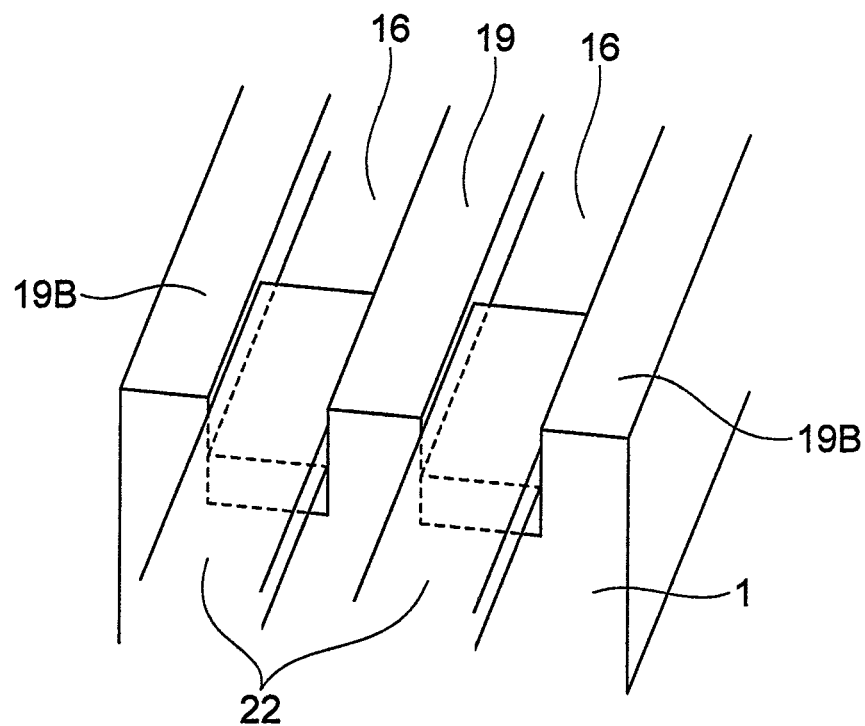
FIG. 21 is a view showing a modified embodiment of FIG. 19.
Figure 21:
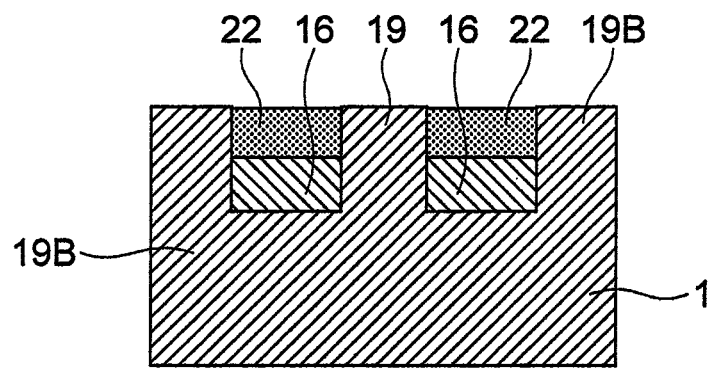

At this time, for example, in the case that a lot of module side weld terminals 22 are provided, for the purpose of preventing an erroneous connection to the adjacent terminal due to a displacement of the module, the projection portion 19 shown in FIGS. 1, 15 and 16 are integrally molded with the case resin 15 as shown in FIG. 21, as the projection portion having such a width as to fill between a plurality of bus bars 16, whereby it is possible to limit the movement in the lateral direction of the module side weld terminal 22, and it is further possible to easily position for the bonding work such as the welding or the like. In this drawing, the resin case 1 serving as the circuit mounting case has a projection portion 19B in an opposite side to the projection portion 19 with respect to the bus bar 16, and the bus bar 16 is welded to the module side weld terminal 22 corresponding to the other terminal at the position exposing to the outer portion of the circuit mounting case between the projection portion 19 and the opposite side projection portion 19B.

Figure 22:
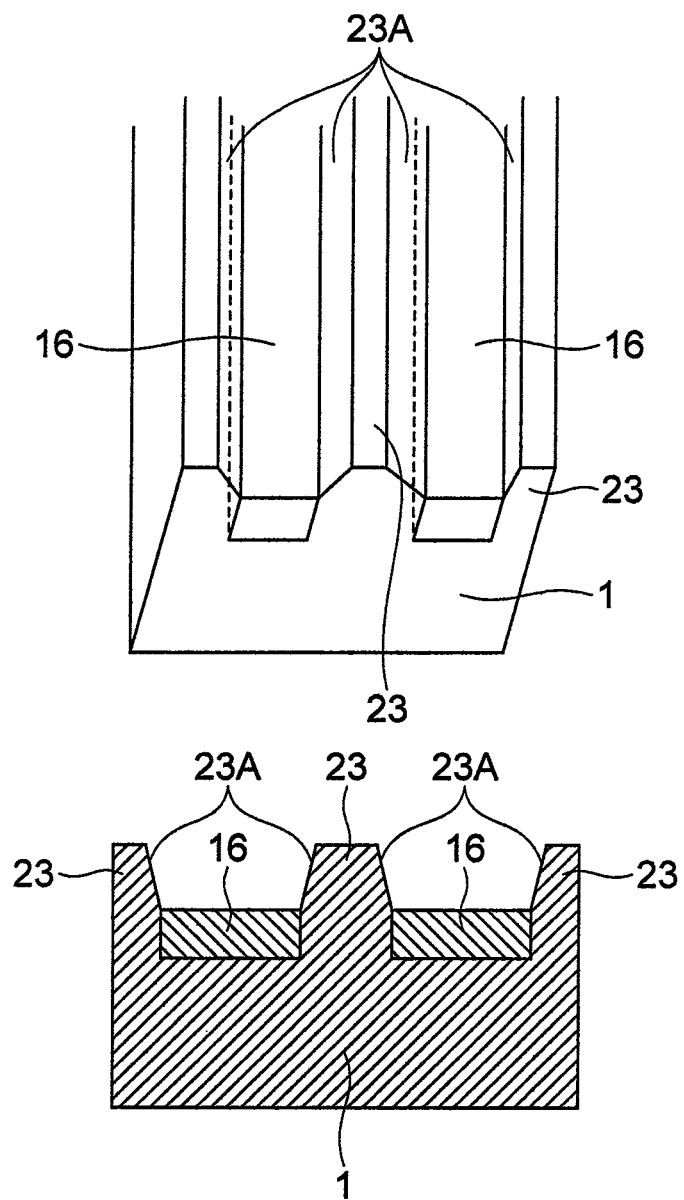
FIG. 22 is a view showing a modified embodiment of FIG. 19.

Further, as shown in FIG. 22, a taper 23A is provided in a projection portion having such a width as to substantially fill between a plurality of bus bars 16, and integrally molded with the resin case 15 in FIG. 21. It is possible to expect that the work can be simplified at a positioning margin with respect to an inserting work of the module side weld terminal 22, on the basis of the tapered projection portion 23. The taper 23A is structured such that an interval becomes narrowed in accordance that the taper 23A comes close to the bus bar 16 as shown in the drawing.

Figure 23:
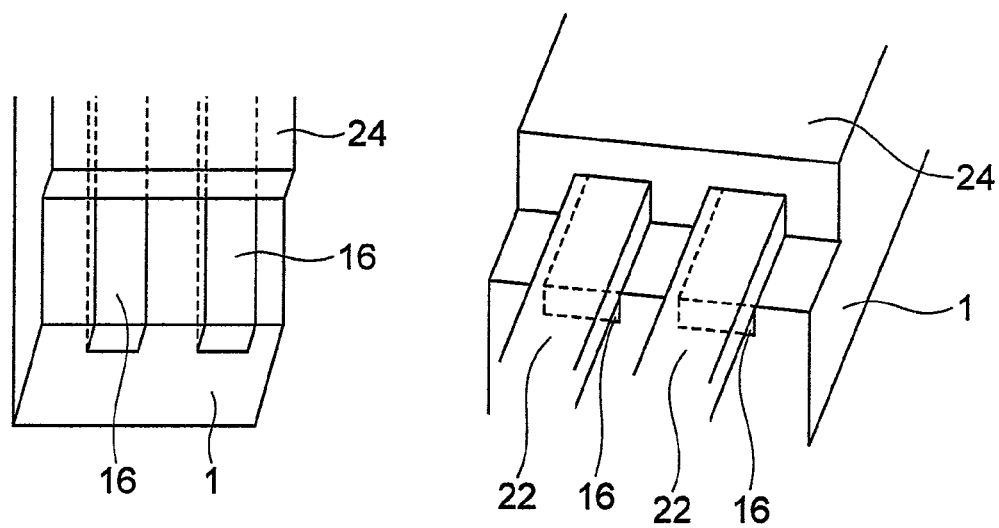
FIG. 23 is a view showing a modified embodiment of FIG. 19.

FIG. 23 is a schematic view showing a structure in which a plurality of bus bars 16, and a projection portion 24 made of an insulating material such as a resin or the like so as to be orthogonal to the wiring direction are provided on the surfaces of the bus bar 16 and the resin case 1, in the embodiment of the bus bar embedded structure. Accordingly, it is possible to easily position the module side weld terminal 22 in a depth direction. In this case, the projection portion 24 may be assembled in the resin case 1 after being manufactured independently from the resin case 1, or may be molded integrally with the resin case 1.

Figure 24:
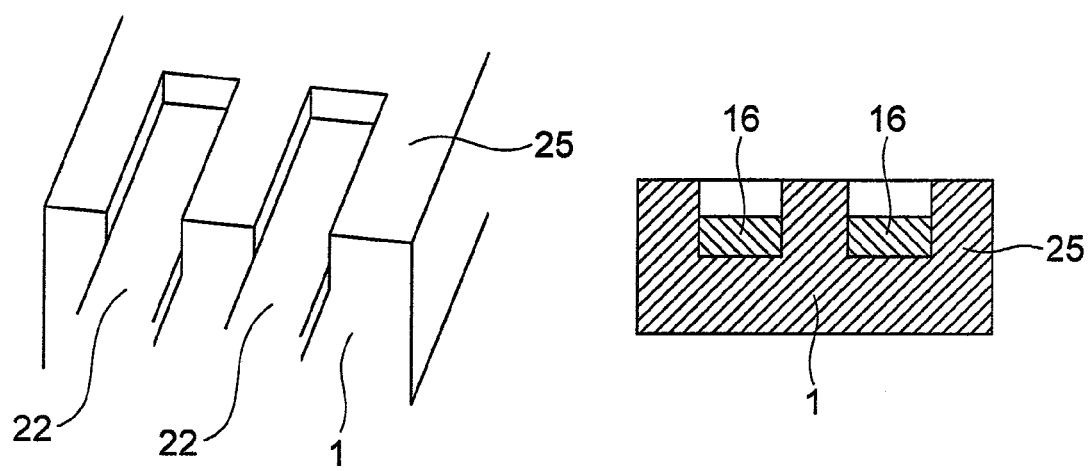
FIG. 24 is a view showing a modified embodiment of FIG. 19.

Subsequently, FIG. 24 is a schematic view showing a projection portion 25 obtained by combining the positioning in the lateral direction of the module side weld terminal 22 by the projection portion between a plurality of bus bars in FIG. 21, and the positioning in the depth direction of the module side weld terminal 22 by the projection portion provided so as to be orthogonal to the bus bar wiring direction in FIG. 23. Accordingly, the module side weld terminal 22 is easily positioned on the plane.

It is possible to apply the control unit having the structure obtained by including the countermeasure with respect to the conductive foreign matter at the same time of achieving the downsizing, and taking into consideration the improvement of the manufacturing quality by the device for simplifying the assembly, and the bonding and mounting technique having a high reliability such as the welding, the package module and the like, to a whole of an actuator integrated type control unit in a so-called industrial machine field, including a train, a construction machine and the like, in addition to the motor vehicle.

In the brake unit for the motor vehicle among them, since the control unit is mounted to the portion in which an oscillating part including a suspension, so called, an unsprung section, the downsizing, particularly the thin structure is demanded. Further, in the light of a vehicle behavior, it is demanded to lighten an unsprung part. Further, taking into consideration a submergence under water, an oscillation via no attenuator and an impact environment, the control unit in accordance with the present embodiment is effective particularly in the integration with the brake actuator. In recent years, in the electric circuit structure of the control unit in which the compact and light structure is demanded, it is necessary to simply carry out a weight reduction of the constituting resin mentioned above while taking a strength and a reliability into consideration. The present embodiment can provide the electric circuit structure of the control unit which can sufficiently consider the compact and light structure of the electric circuit structure of the control unit, particularly the thinness in the thickness direction of the structure.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An electro-mechanical brake unit comprising:
   an electric motor;

a pad generating a friction force on the basis of a rotational drive force of said electric motor, the pad being arranged at a first end of the electric motor; and a control unit arranged at a second end of said electric motor, the first end and the second end being on opposite sides of the electric motor, wherein said control unit has a resin case constructed by a resin, an inverter module retained by said resin case and including a plurality of terminals, a plurality of bus bars, and a metal case covering said resin case and said inverter module, wherein each of said plurality of bus bars is partially exposed to outside of an outer surface of the resin case and has a connection portion for being connected to a terminal of said inverter module, wherein a first surface of the connection portion of said bus bars is embedded in said resin case and a second surface of the connection portion of the bus bars opposite said first surface is exposed to the outside of the outer surface of said resin case, wherein the terminals of said inverter module are arranged so as to overlap the connection portions of said bus bars and are connected to the connection portions of the bus bars, and wherein a level of the outer surface of the resin case located between adjacent bus bars is the same as a level of the outer surface of the resin case located outside of each of the adjacent bus bars, except that the resin case includes a resin projection portion projecting from a part of the outer surface of the resin case located between adjacent bus bars and projecting away from the second surface of each of the plurality of bus bars.

2. An electro-mechanical brake unit as claimed in claim 1, wherein said inverter module forms a flat shape including first and second surfaces which are provided in parallel with each other, and a plurality of side surfaces connecting said first and second surfaces around said first and second surfaces, wherein the plurality of terminals of said inverter module protrude in a direction along a direction of said first and second surfaces from the side surfaces of said inverter module, and wherein said plurality of protruding terminals are connected to the connection portion of said bus bar.

3. An electro-mechanical brake unit as claimed in claim 1, wherein the plurality of terminals of said inverter module are connected to the connection portion of said bus bar by welding.

4. An electro-mechanical brake unit as claimed in claim 1, further comprising:

an actuator; and an actuator case storing said actuator, wherein said actuator has a mechanism for converting a rotating force of said electric motor into a linear motion, and wherein said control unit arranges a control board in a side of said actuator and arranges said inverter module in an opposite side to said actuator.

5. An electro-mechanical brake unit comprising:

an actuator;

an actuator case storing said actuator;

a control unit integrally assembled with said actuator; and a pad for generating a braking force, wherein said actuator has an electric motor, and a converting mechanism converting a rotational drive force of said electric motor into a linear motion for generating a braking force by said paid, wherein said control unit has a resin case constructed by a resin, an inverter module including a plurality of terminals, a plurality of bus bars, and a metal case storing said resin case and said inverter module, wherein each of said plurality of bus bars is partially exposed to outside of an outer surface the resin case and has a connection portion for being connected to a terminal of said inverter module, wherein a first surface of the connection portion of said bus bars is embedded in said resin case and a second surface of the connection portion of the bus bars opposite said first surface is exposed to the outside of the outer surface said resin case, wherein the terminals of said inverter module are arranged so as to lap over the connection portions of said bus bars and are connected to the connection portions of said bus bars, and wherein a level of the outer surface of the resin case located between adjacent bus bars is the same as a level of the outer surface of the resin case located outside of each of the adjacent bus bars, except that the resin case includes a resin projection portion projecting from a part of the outer surface of the resin case located between adjacent bus bars and projecting away from the second surface of each of the plurality of bus bars.

6. An electro-mechanical brake unit as claimed in claim 5, wherein the plurality of terminals of said inverter module are connected to the connection portion of said bus bar by welding.

* * * * *